Figure 1:
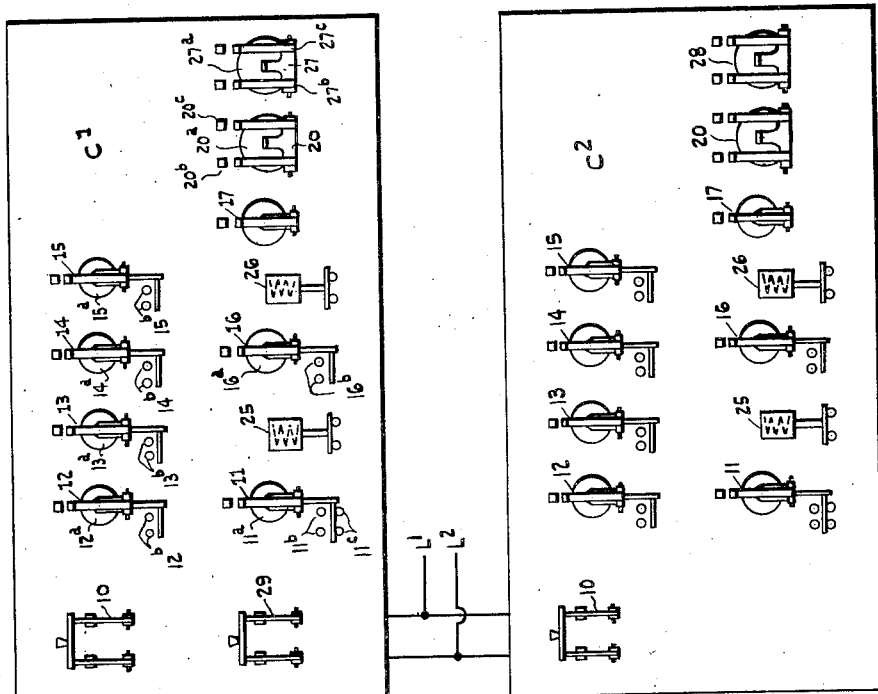
Figure 1:
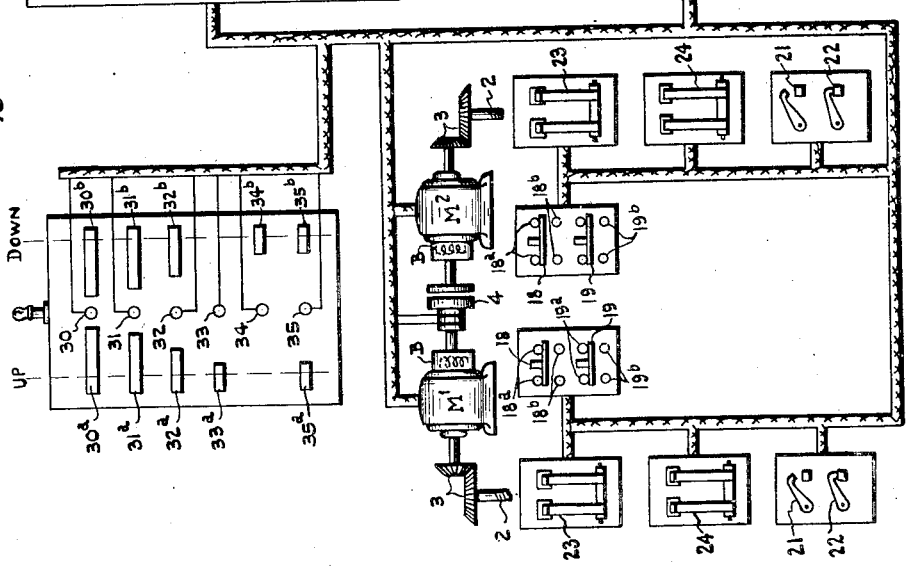

May 23, 1933.  P. B. HARWOOD  1,910,606
MOTOR CONTROLLER
Filed Aug. 3, 1928   2 Sheets-Sheet 1

INVENTOR
Paisley B. Harwood.
BY
ATTORNEY

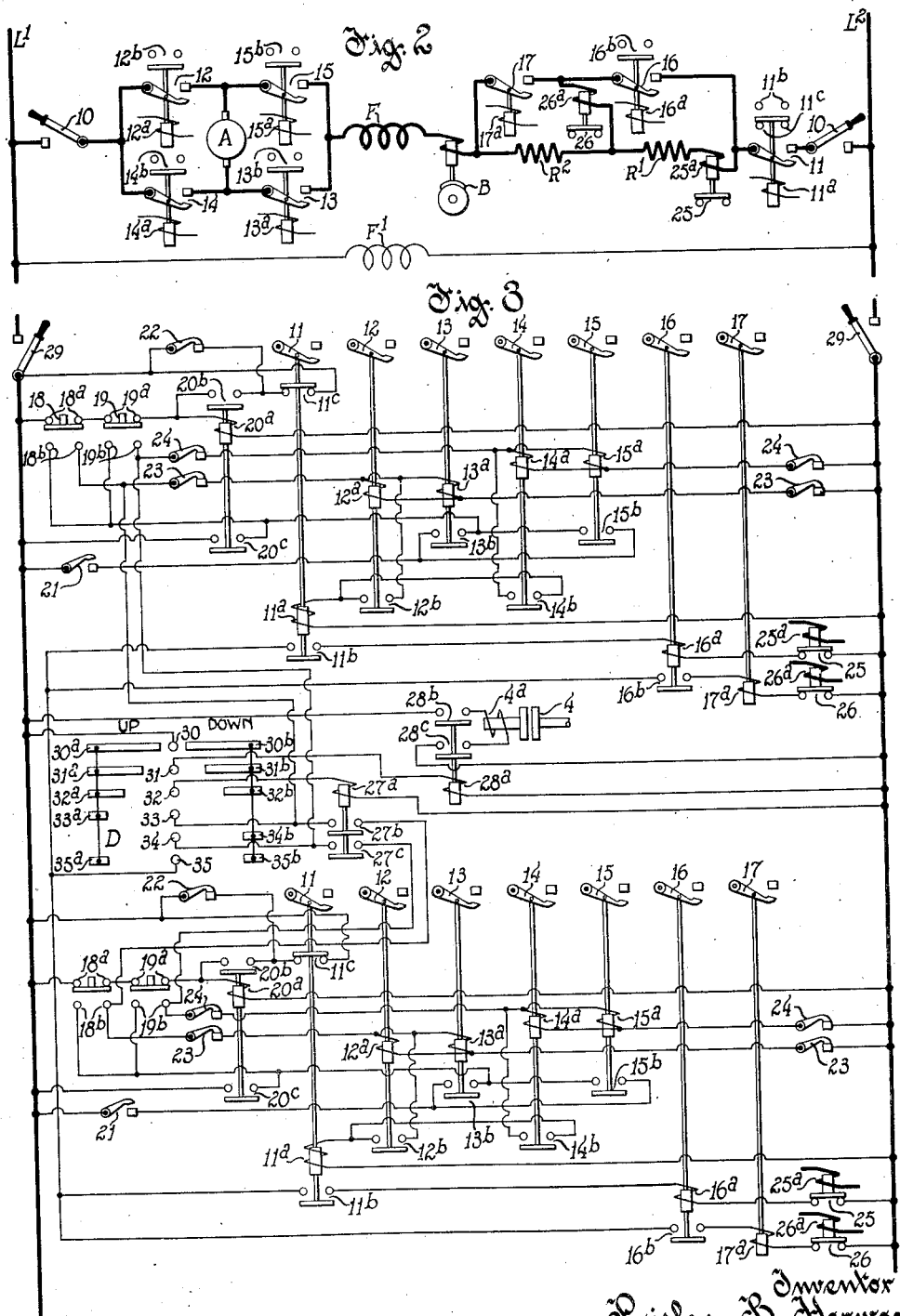

Patented May 23, 1933                                                              1,910,606

UNITED STATES PATENT OFFICE

PAISLEY B. HARWOOD, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

MOTOR CONTROLLER

Application filed August 3, 1928. Serial No. 297,214.

This invention relates to motor controllers and while not limited thereto is particularly applicable to controllers for motor driven adjusting mechanisms.

The invention has among its objects to provide an improved controller for motor driven adjusting mechanisms, as for example rolling mill screw downs which provides for adjustments of great accuracy by the simple manipulation of push button control switches.

Another object is to provide a controller for motor driven adjusting mechanisms which provides for movement of the adjustable parts at a relatively slow speed and by small steps for fine adjustments and which also provides for movement of such parts at a relatively high speed and without intermittent stopping for coarse adjustments.

Another object is to provide a controller for motor driven rolling mill screw downs which provides for movement of either end of the adjustable roll at a slow speed and by small steps for fine adjustments and which also provides for adjustment of both ends of the adjustable roll in unison and at a relatively high speed for coarse adjustments.

Various other objects and advantages of the invention will hereinafter appear.

The accompanying drawings illustrate an embodiment of the invention which will now be described, it being understood that the embodiment illustrated is susceptible of various modifications and various different uses without departing from the spirit and scope of the appended claims.

In the drawings,

Figure 1 illustrates the elements of a controller embodying the invention.

Fig. 2 diagrammatically illustrates one of the sets of control elements illustrated in Fig. 1 and the circuits controlled thereby, and Fig. 3 diagrammatically illustrates the control circuits for the system shown in Fig. 1.

Referring to Fig. 1, the same illustrates a pair of driving motors $M^1$ and $M^2$, each of which is arranged to drive a screw 2 through the medium of a set of bevel gears 3. It is assumed that the screws 2 are associated with an adjusting mechanism, as for example a rolling mill screwdown.

The motors $M^1$ and $M^2$ are provided with reversing controllers $C^1$ and $C^2$, respectively, and as hereinafter set forth each of said controllers provides for operation of its associated motor in opposite directions at a relatively slow speed and by small steps for accurate adjustment of the associated screw 2. The motors $M^1$ and $M^2$ are also capable of being controlled by a drum D through the medium of the controllers $C^1$ and $C^2$. As hereinafter set forth, said drum acts through the medium of controllers $C^1$ and $C^2$ to provide for continuous operation of both motors in either direction between given limits and also serves to control an electromagnetic clutch 4 for establishing a driving connection between said motors to insure operation of the screws 2 at the same speed.

Each of the controllers $C^1$ and $C^2$ is provided with means for controlling the power circuit of its associated motor comprising a line switch 10, an electromagnetically operated main switch 11, two sets of electromagnetically operated reversing switches 12—13 and 14—15, and a pair of electro-magnetically operated accelerating switches 16 and 17. The reversing switches of each controller are selectively controlled by means of push buttons 18 and 19, through the medium of a double pole electromagnetic relay 20 and limit switches 21 to 24, inclusive, while the accelerating switches 16 and 17 are controlled by the drum D through the medium of normally closed series relays 25 and 26. The controller $C^1$ is further provided with a double pole electromagnetically operated relay 27 which serves as hereinafter set forth to establish connections between controllers $C^1$ and $C^2$ to provide for control of both of the motors $M^1$ and $M^2$ by the drum D while controller $C^2$ is provided with a double pole electromagnetically operated relay 28 which is also controlled by drum D and serves to control the energizing circuit of clutch 4. Controller $C^1$ is further provided with a knife switch 29 for controlling the energizing circuits of the switches and relays of both controllers.

For purposes hereinafter set forth the main switch 11 of each controller is provided with normally open auxiliary contacts $11^b$ and normally closed auxiliary contacts $11^c$, while each of the reversing switches 12, 13, 14 and 15 and the accelerating switch 16 is provided with normally open auxiliary contacts designated by reference character "$b$". The push buttons 18 and 19 of each controller are biased to engage a set of up contacts indicated by reference character "$a$" and are movable into engagement with a set of down contacts indicated by reference character "$b$". The limit switches 21 to 24 of each controller are driven by their associated motor through the medium of any suitable type of operating mechanism. Limit switches 21 and 22 are adapted to open upon each revolution of the motor and for purposes hereinafter set forth the former switch is arranged to close prior to opening of the latter. Limit switch 23 opens upon movement of the adjusting mechanism into its lower limit while limit switch 24 opens upon movement of the adjusting mechanism into its upper limit.

The drum D hereinbefore mentioned is provided with a series of stationary contacts 30 to 35, inclusive, and two sets of movable contacts arranged on opposite sides of said stationary contacts. One set of movable contacts includes contacts $30^a$, $31^a$, $32^a$, $33^a$ and $35^a$ while the other set includes contacts $30^b$, $31^b$, $32^b$, $34^b$ and $35^b$.

The function and operation of the aforedescribed controller together with the circuit connections will now be more fully described in connection with Figs. 2 and 3. The motors $M^1$ and $M^2$ are connected in the same manner and therefore only one of the same is shown in Fig. 2. Each of said motors is provided with an armature A, a series field F and a shunt field $F^1$, and each of the same is provided with a brake B having an operating winding connected in series in the motor circuit. Also, each of the motors has resistances $R^1$ and $R^2$ connected in series therewith, the former to be excluded from the motor circuit by accelerating switch 16 and the latter by accelerating switch 17. The operating windings of relays 25 and 26 associated with each of the controllers $C^1$ and $C^2$ are also connected in the motor circuit as shown in Fig. 2.

The operation and circuit connections of controller $C^1$ will now be described in connection with Fig. 3, it being understood that the controller $C^2$ operates in a similar manner.

Closure of switch 29 connects the operating winding $20^a$ of relay 20 across lines $L^1$ $L^2$, through the medium of the up contacts $18^a$ and $19^a$ of push buttons 18 and 19. Relay 20 in responding maintains itself by a circuit extending from $L^1$ through limit switch 22 and the left hand pole $20^b$ of relay 20 to and through the operating winding $20^a$ of said relay to line $L^2$. Assume now that it is desired to operate the motor $M^1$ in its up direction. Push button 18 is depressed to establish an energizing circuit extending from line $L^1$ through the right hand pole $20^c$ of relay 20, through contacts $18^b$ of said push button, through one pole of limit switch 23 and thence through the operating windings $12^a$ and $13^a$ of reversing switches 12 and 13 and through the other pole of limit switch 23 to line $L^2$. Reversing switches 12 and 13 thus respond and the main switch 11 is then energized by a circuit extending from line $L^1$ through the right hand pole $20^c$ of relay 20, through the down contacts $18^b$ of push button 18, through one pole of limit switch 23 and the auxiliary contacts $12^b$ associated with reversing switch 12 and thence through the operating winding $11^a$ of said main switch to line $L^2$. Motor $M^1$ is now connected across lines $L^1$, $L^2$ through the medium of resistances $R^1$ and $R^2$ with its brake B released and it is assumed that the same operates in its up direction. Upon initial operation of motor $M^1$ limit switch 21 closes to establish a maintaining circuit for main switch 11 and reversing switches 12 and 13 extending from line $L^1$ through said limit switch, through auxiliary contacts $13^b$ associated with reversing switch 13 to the contacts $18^b$ and thence through the operating windings of said main switch and said reversing switches to line $L^2$ as already traced. Following closure of limit switch 21 limit switch 22 opens to interrupt the aforedescribed maintaining circuit for relay 20 and said relay returns to open position. After a complete revolution of the motor limit switch 21 opens to deenergize main switch 11 and reversing switches 12 and 13 and limit switch 22 returns to closed position. The motor $M^1$ is thus stopped and in order to restart the same it is necessary to permit the return of push button 18 to normal position whereupon relay 20 is again energized and maintained in closed position. By successively depressing and releasing push button 18 the motor is operated in steps each consisting of a single revolution and when the adjusting mechanism moves into its upper limit limit switch 23 is opened to prevent energization of the up reversing switches 12 and 13.

The controller $C^1$ operates in a manner similar to that above described for operation of the motor in its down direction. To operate the motor in its down direction push button 19 is depressed to establish an energizing circuit for reversing switches 14 and 15 extending from line $L^1$ through the right hand contacts 20ᶜ of relay 20 through the down contacts 19ᵇ of said push button through one pole of limit switch 24 and thence through the operating windings 14ᵃ and 15ᵃ of the down reversing switches and through the other pole of limit switch 24 to line L². Upon response of reversing switches 14 and 15 the auxiliary contacts 14ᵇ associated with the former reversing switch establish an energizing circuit for main switch 11 extending from line L¹ through the right hand contacts 20ᶜ of relay 20 through the down contacts 19ᵇ of push button 19 through one pole of limit switch 24 and through auxiliary contacts 14ᵇ and the operating winding 11ᵃ of the main switch to line L². Upon initial operation of the motor in its down direction limit switch 21 shunts contacts 20ᶜ of relay 20 through the medium of contacts 15ᵇ to establish a maintaining circuit for the main switch 11 and reversing switches 14 and 15 and immediately thereafter limit switch 22 opens to interrupt the energizing circuit of relay 20. Upon completion of one revolution of the motor, limit switch 21 opens to interrupt the aforedescribed energizing circuits for the main switch 11 and reversing switches 14 and 15 and the motor is thus stopped. The motor can only be restarted by returning push button 19 to normal position whereupon relay 20 is again energized as hereinbefore set forth. Thus by successively operating push button 19 the motor is operated in its down direction in steps each consisting of a single revolution and when the adjusting mechanism is moved into its lower limit limit switch 24 opens to prevent energization of the down reversing switches 14 and 15.

In connection with the foregoing it should be noted that when the motor is operating in either direction the same can be stopped at any point by releasing push button 18 or 19, as the case may be. If the motor is stopped in a position wherein the limit switch 22 is in open position the contacts 11ᶜ associated with the main switch 11 serve upon opening of said main switch to establish a shunt circuit around the limit switch 22. Thus relay 20 in responding is adapted to maintain itself through the medium of the contacts 11ᶜ and its right hand pole 20ᵇ to provide for establishment of the aforedescribed energizing circuits for the reversing switches 12, 13 or 14, 15 by the push buttons 18 and 19.

As before stated, the drum D is adapted to act through the medium of controllers C¹ and C² to provide for simultaneous operation of both of the motors M¹ and M² and said drum also serves to control a clutch 4 for establishing a driving connection between said motors to insure operation thereof at the same speed. Upon movement of the drum D in either direction out of off position relay 28 is conected across lines L¹—L² through the medium of contacts 30 and 31 of said drum, and as is apparent from Fig. 3 said relay in responding connects the operating winding 4ᵃ of clutch 4 across lines L¹—L². Also, upon movement of the drum D in either direction out of off position the operating winding of relay 27 is connected across lines L¹—L² through the medium of contacts 30 and 32 of said drum. When the drum D is moved into its "up" position the operating windings of reversing switches 12 and 13 of controller C¹ are connected across lines L¹—L² through the medium of the limit switch 23 of said controller and contacts 30, 30ᵃ, 33ᵃ and 33 of said drum and the operating windings of the reversing switches 12 and 13 of controller C² are connected across lines L¹—L² through the medium of said drum contacts the pole 27ᵇ of relay 27 and the limit switch 23 associated with the latter controller. When the drum D is moved into its "down" position the operating windings of reversing switches 14 and 15 of controller C¹ are connected across lines L¹—L² through the medium of the limit switch 24 of said controller and contacts 30, 30ᵇ, 34 and 34ᵇ of said drum and the reversing switches 14 and 15 of controller C² are connected across lines L¹—L² through the medium of said drum contacts, the pole 27ᶜ of relay 27 and the limit switch 24 of the latter controller. In each of the controllers C¹ and C² the main switch 11 is energized by auxiliary contacts 12ᵇ upon closure of reversing switches 12 and 13 and by auxiliary contacts 14ᵇ upon closure of reversing switches 14 and 15. Also when the master drum is in either its up or down position the same establishes connections for energization of the accelerating switches 16 and 17 of each of the controllers C¹ and C². The operating winding of accelerating switch 16 of each of the controllers C¹ and C² is adapted to be connected across lines L¹—L² through the medium of drum contacts 30 and 35, auxiliary contacts 11ᵇ of said main switch and relay 25, while the operating winding of accelerating switch 17 of each of said controllers is adapted to be connected across lines L¹—L² through the medium of said drum contacts, the auxiliary contacts 16ᵇ associated with relay 16, and the series relay 26. The relays 25 and 26 respond immediately upon establishment of the motor circuit and reclose upon given current conditions in the motor circuit, and the same thus operate in a well known manner to time the operation of accelerating switches 16 and 17.

From the foregoing it is apparent that the drum D provides for operation of both of the motors at a relatively high speed and also provides for energization of clutch 4 to insure operation of the motors at the same speed.

What I claim as new and desire to secure by Letters Patents is:

1. In a controller for motor driven adjusting mechanisms, in combination, means for establishing reverse power connections for the motor including a pair of control switches each having off and starting positions, an electroresponsive relay adapted to be energized when both of said control switches are in off position and providing connections for starting of the motor upon movement of either of said control switches into starting position, means for deenergizing said relay upon starting of said motor and means including a limit switch associated with the motor for maintaining the same in operation upon opening of said relay, said limit switch being operable upon a predetermined degree of operation of the motor to effect stopping thereof.

2. In a controller for motor driven adjusting mechanisms including a plurality of operating motors, in combination, a controller associated with each of the motors for effecting step by step operation thereof, a master controller adapted to act through the medium of the former controllers to provide for simultaneous operation of both of said motors and a clutch controlled by said master controller for establishing a driving connection between said motors to insure operation thereof at the same speed.

3. In a rolling mill screw down, in combination, a pair of motor operated screws, a controller associated with the operating motor of each of said screws, each of said controllers providing for step by step operation of its associated motor at a reduced speed and a master controller adapted to act through the medium of the former controllers to provide for continuous operation of both of said motors at an increased speed.

4. In a controller for motor driven adjusting mechanisms in combination, a manually operated control switch for the motor having off and starting positions, a limit switch driven by the motor and adapted to act through the medium of said control switch when the latter is in starting position to stop the motor upon a predetermined cycle of operation thereof, and means acting only upon return of said control switch to off position to establish connections which provide for restarting of the motor upon movement of said control switch into starting position.

5. In a controller for motor driven adjusting mechanisms, in combination, a manually operated control switch adapted in one position to establish connections for starting the motor and in another position to interrupt such connections to stop the motor, a limit switch driven by the motor and adapted to act through the medium of said control switch when the latter is in starting position to stop the motor upon a given cycle of operation thereof and an electromagnetic relay responsive to shunt said limit switch to provide for restarting of the motor by said control switch, said relay being responsive only upon return of said control switch to off position.

6. In a controller for motor driven adjusting mechanisms, in combination, a manually operated control switch for the motor having off and starting positions, a limit switch driven by the motor and adapted to act through the medium of said control switch when the latter is in starting position to maintain the motor in operation pending a given cycle of operation thereof, a relay for shunting said limit switch and adapted to close only upon movement of said control switch into off position, and means acting upon movement of said control switch into starting position to maintain said relay closed until closure of said limit switch.

7. In a controller for motor driven adjusting mechanisms, in combination, a manually operated control switch for the motor having off and starting positions, a limit switch driven by the motor and adapted to act through the medium of said control switch when the latter is in starting position to stop the motor after a predetermined cycle of operation thereof, a second limit switch driven by the motor and arranged to open upon closure of said former limit switch and an electromagnetic relay responsive to shunt said former limit switch to provide for restarting of the motor by said control switch, said relay being responsive only upon return of said control switch to off position and being adapted upon movement of said control switch out of off position to maintain itself in closed position through the medium of said second mentioned limit switch.

8. In a motor control system, a plurality of motors, a relay system associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction.

9. In a motor control system, a plurality of motors, a relay system associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction, and in another of its positions another group of contact members causes the motors to turn in an opposite direction.

10. In a motor control system, a plurality of motors, starting switches for the motors, a relay system associated with each motor for starting the motor and for controlling the direction of and the amount of rotation of the motor, an electro-responsive clutch for connecting the motors to cause any motor to be driven by another motor and a controller having a plurality of groups of relatively movable contact members, one of which groups controls the energization of said clutch in a plurality of positions of the controller other than the neutral position, said controller being so connected to the relay systems for the different motors that in one of its positions another group of contact members controls the interconnection of the relay systems for causing the motors to turn in a definite direction independently of the starting switches associated with the different relay systems.

11. In a motor control system, a plurality of motors, a relay system comprising a starting switch associated with each motor for starting the motor and for controlling the direction of and the amount of rotation of the motor, an electro-responsive clutch for connecting the motors to cause any motor to be driven by another motor, and a controller having a plurality of groups of relatively movable contact members, one of which groups controls the energization of said clutch in a plurality of positions of the controller, said controller being so connected to the relay systems for the different motors that in one of its positions another group of contact members controls the interconnection of the relay systems for causing the motors to turn in a definite direction, and in another of its positions another group of contact members causes the motors to turn in an opposite direction independently of the starting switches associated with the different relay systems.

12. In a motor control system, a plurality of motors, a limit switch associated with each motor for controlling its rotation, a starting switch for each motor, a relay system associated with each motor for connecting the associated starting switch, motor and limit switch, a clutch for connecting the motors, a controller having a plurality of groups of contact members, one of said groups of contact members completing a circuit to the clutch in a plurality of operating positions of the controller, another of the groups of contact members in one position of the controller, completing circuits for interconnecting the relay systems of the motors for causing the motors to rotate in one direction independently of the starting switches and limit switches associated with the separate motors.

13. In a motor control system, a plurality of motors, a limit switch associated with each motor for controlling its rotation, a starting switch for each motor, a relay system associated with each motor for connecting the associated starting switch, motor and limit switch, a clutch for connecting the motors, a controller having a plurality of groups of contact members, one of said groups of contact members completing a circuit to the clutch in a plurality of operating positions of the controller, another of the groups of contact members, in one position of the controller, completing circuits for interconnecting the relay systems of the motors for causing the motors to rotate in one direction independently of the starting switches and limit switches associated with the separate motors, and another group of contact members on the controller, when the controller is in another position, completing circuits for interconnection to the relay systems for causing the motors to rotate in a reverse direction.

14. In a motor control system, a plurality of motors, a relay system associated with each motor for starting the motor and for controlling the direction of and the amount of rotation of the motor, a clutch for connecting the motors to cause any motor to be driven by another motor, and a controller having a plurality of groups of relatively movable contact members, said controller causing the operation of said clutch in a plurality of positions of the controller, said controller being so connected to the relay systems for the different motors that in one of its positions a group of contact members controls the interconnection of the relay systems for causing the motors to turn in a definite direction.

15. In a control system for a plurality of motors, a separate control system for each of the motors, each control system comprising a control switch, means for mechanically interlocking a plurality of said motors, and a controller for controlling the interlocking means and for completing circuits for connecting the control systems of the interlocked motors so that a plurality of motors may be controlled from the switch in any one of the connected motor control systems.

16. In a controller for motor driven mechanisms including a plurality of operating motors, in combination, a controller associated with each of the motors for effecting step by step operation thereof, each of said controllers including electromagnetically operated reversing switches and push buttons for selectively controlling the same, a master switch, means under the control of said master switch for interconnecting said controllers at points between the operating windings of corresponding reversing switches and their associated push buttons, and a clutch under the control of said master switch for establishing a driving connection between said motors.

In witness whereof, I have hereunto subscribed my name,

PAISLEY B. HARWOOD.